No. 639,697. Patented Dec. 19, 1899.
N. SCHWARTZ.
COMBINED ROLLER AND HARROW.
(Application filed May 10, 1899.)

(No Model.) 2 Sheets—Sheet 1.

WITNESSES
Louis D. Heinrichs
Chas. S. Hyer

INVENTOR
Nicholas Schwartz
By Victor J. Evans.
Attorney

THE NORRIS PETERS CO., PHOTO-LITHO., WASHINGTON, D. C.

No. 639,697. Patented Dec. 19, 1899.
N. SCHWARTZ.
COMBINED ROLLER AND HARROW.
(Application filed May 10, 1899.)
(No Model.) 2 Sheets—Sheet 2.

WITNESSES
Louis D. Heinrichs.
Chas. S. Hyer.

INVENTOR
Nicholas Schwartz
By Victor J. Evans
Attorney

UNITED STATES PATENT OFFICE.

NICHOLAS SCHWARTZ, OF AURORA, INDIANA.

COMBINED ROLLER AND HARROW.

SPECIFICATION forming part of Letters Patent No. 639,697, dated December 19, 1899.

Application filed May 10, 1899. Serial No. 716,282. (No model.)

*To all whom it may concern:*

Be it known that I, NICHOLAS SCHWARTZ, a citizen of the United States, residing at Aurora, in the county of Dearborn and State of Indiana, have invented certain new and useful Improvements in a Combined Roller and Harrow; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to combined rollers and harrows, and is intended to advantageously serve in rolling and harrowing the soil in such manner that it will not be packed down or caked by subsequent rains or absorption of moisture, but be left in loose condition and free to receive the moisture and remain in disintegrated condition; also, to thoroughly drag off all trash from the soil and completely break up or comminute the lumps; further, to obtain the full benefit of a yielding harrow-tooth without making the same directly resilient, and thereby overcoming the inconveniences incident to a freely-bendable tooth, and, further, to provide means for permitting the harrow to be easily transported from place to place without the use of a vehicle and to turn the some without drag.

The invention consists of a frame rotatably supporting a sectional or two-part roller having series of teeth at the rear arranged in pairs and connected by links to adjusting devices, one of each pair of teeth being in advance of the other, and both teeth having pivotal shovel attachments on the lower ends with springs connected thereto and to a part of the frame in advance to permit said shovel extensions to have a backward yielding movement and pass rigid obstructions without injury to the several teeth.

The invention further consists of the details of construction and arrangement of the several parts, which will be more fully hereinafter described and claimed.

Figure 1:
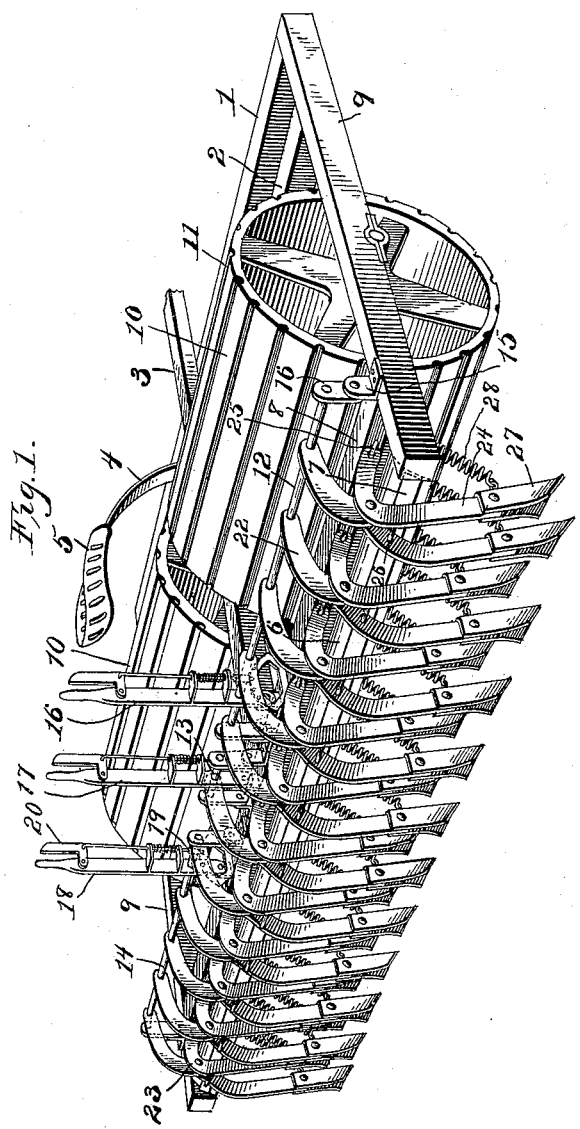
Figure 2:
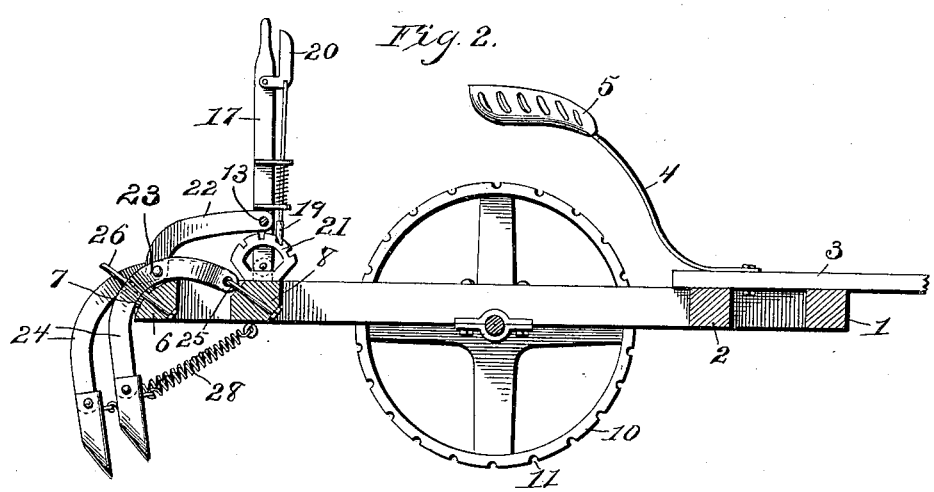
Figure 3:
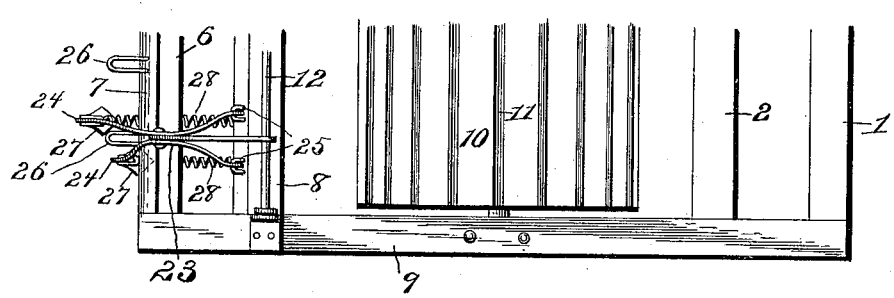
Figure 4:
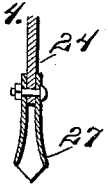

In the accompanying drawings, Figure 1 is a perspective view of a combined roller and harrow embodying the invention. Fig. 2 is a longitudinal vertical section of the same. Fig. 3 is a top plan view of a part of the device. Fig. 4 is a transverse vertical section through a part of one of the teeth and the shovel extension to illustrate the pivotal attachment of the latter.

Similar characters of reference are employed to indicate corresponding parts in the several views.

The numeral 1 designates a frame of suitable material and dimension and comprising opposite end and front and rear bars or beams. At the front the said frame is provided with a transverse beam 2 a comparatively short distance inside of the outer beam, and to the center of these two front beams a tongue 3 is fixed and has rising from the rear part thereof a yielding support 4, having a seat 5 fastened to the upper end thereof. The rear end beam 6 has a rear curved surface 7 to accomplish the operation of parts extending thereover, and inside of the same is a transversely-extending supporting-beam 8. Between the opposite end beams 9 of the frame two rollers 10 are journaled and arranged in transverse alinement, both rollers preferably having surface corrugations 11 for evident purposes. Over the said supporting-beam 8 adjusting-bars 12, 13, and 14 are mounted and have bearing at their ends in ears 15 through the medium of end links 16, pivoted to said ears. The bars 12 and 14 are connected to opposite end sets of teeth and the bar 13 to an intermediate set of teeth. It is preferred that the end sets each include ten teeth and the intermediate set two teeth, though this number may be varied at will. The bars 12, 13, and 14 are shiftable by means of adjusting-levers 16, 17, and 18, each having in connection therewith a spring-actuated dog 19, operated by an upper supplemental lever 20 and coacting with toothed segments 21 relatively positioned to the lower ends thereof. The adjusting-levers 16, 17, and 18 are located just in rear of the seat 5 and within accessible reach of the operator occupying the said seat.

To the bars 12, 13, and 14 links 22 are secured and curved downwardly at their rear ends and pass between the upper curved portions 23 of teeth 24. Each link is attached to a pair of teeth, and the said upper curved portions 23 of the teeth in advance of their point of attachment to the said links are spread or diverged and movably attached to the supporting-beam 8 by means of staples 25. This divergent arrangement strengthens the teeth and facilitates their securement to the said supporting-beam in a more convenient manner. Projecting rearward from the rear beam 6 are guards 26, which extend between each pair of teeth and guide the latter in their adjustment and also hold them in place and prevent lateral movement of the same. One tooth of each pair is farther to the rear than the other, and the entire series of teeth are arranged to establish a transverse alinement, respectively, of the advance and rear teeth. The pairs of teeth 24 are also separated, as clearly shown in Fig. 3, so as to cover a large surface, and by having the links 22 attached to said pairs a smaller number of parts is required to serve in the capacity of intermediate adjusting devices, and, furthermore, a uniformity of positioning the teeth is maintained.

To the lower ends of the teeth 24 shovel-points 27 are pivotally attached and have lower slightly-flared portions, being each preferably constructed of a single piece of material bent at its upper end to embrace the lower part of each tooth. The purpose of pivoting the shovel-points is to allow them to ride over rigid obstructions with which they may come in contact during their movement over the ground surface, and in this operation they freely swing rearwardly against the resilient action of springs 28, which are attached to the front portions of each and also to an adjacent part of the frame and, as shown in Fig. 2, preferably to the under side of the supporting-beam 8. After passing the obstruction the shovel-points are returned to normal position by the said springs, and the latter are stiff enough to sustain the shovel-points in operative position under all ordinary circumstances. By this means breaking of the teeth is obviated and the difficulties ordinarily encountered in spring-teeth are overcome.

In transporting the combined harrow and roller to and from a field or other tract of land to be treated the adjusting-levers 16, 17, and 18 are moved to elevate all the teeth, and in this adjustment the bars 12, 13, and 14 are turned forward by the said levers and a drawing tension exerted on the links 22, which will cause an upward pull on the teeth. When in use, the teeth are let down and the shovel-points extend deep enough into the ground to effectually carry on the harrowing process. The depth of penetration of the shovel-points may be regulated by throwing the levers 16, 17, and 18 farther toward the rear, and in either event the adjustment can be made temporarily rigid through the operation of the dogs 19 in connection with the segments 21. During the travel of the device over the soil being treated the trash is gathered up in front of the teeth, and the series of teeth, or those controlled by each bar 12, 13, and 14, can be independently dumped or elevated to relieve the same of engagement with any trash. Furthermore, this individual operation of the series of teeth will be found convenient for other purposes, and particularly when finishing up the soil close to a fence or in a narrow tract otherwise located. The two portions 10 of the roller move individually, being carried by separate axles, and consequently in turning the one part is allowed to run faster than the other, and in straight travel there is less drag and strain on the draft-animals. The space between the inner ends of the rollers at the center is in direct alinement with the central series of teeth, and consequently does not act with disadvantage, as said central series of teeth will comminute the soil at this point. It will also be observed that the advantage of rolling the soil is effected by the use of the present device and a thorough crushing attained, with a subsequent loosening up of the surface to avoid mashing down or caking of the soil that is solely treated by means of rollers and caused by a deposit of moisture or from rain that may fall upon the soil after such operation. The construction of the teeth, links, and shovel-points is also advantageous in that flat strips of metal can be utilized and bent into shape or cast, as desired, without requiring a specific form of mold of a complex nature. By the use of the two rollers the advantage of width of the machine is attained also, and thereby provides for the treatment of a large tract of land in a more rapid manner, and with the conveniences heretofore enumerated, than can be acquired by the employment of a single roller.

Changes in the proportions, dimensions, and minor details of construction can be resorted to without departing from the nature or spirit of the invention or sacrificing any of the advantages thereof.

Having thus described the invention, what is claimed as new is—

1. In a combined roller and harrow, the combination with a frame, of parallel transverse beams at the rear thereof; a plurality of bars pivotally mounted upon the inner one of said beams; harrow-teeth diverging at their ends and arranged in pairs pivotally secured to said inner beam; links connecting the teeth to said bars; and spring-controlled shovel-points pivotally secured to the diverging lower ends of the teeth.

2. In a combined roller and harrow, the combination with a frame, of parallel transverse beams at the rear thereof; a plurality of bars pivotally mounted upon the inner one of said beams; levers for adjusting said bars; harrow-teeth arranged in pairs curved to extend over the rear beam; and diverging at their upper ends for attachment to said inner beam; links connecting each pair of teeth with one of said bars; the lower ends of the teeth of each pair being out of transverse alinement.

3. In a combined roller and harrow, the combination with a frame, of parallel transverse beams at the rear thereof; a plurality of adjusting-bars pivotally supported upon the inner beam; levers for adjusting said bars; harrow-teeth arranged in pairs and diverging at their front ends for attachment to the inner beam; links connecting said teeth and adjusting-bars; spring-controlled shovel-points at the lower ends of the teeth, and guards projecting from the rear beam; and extending between the teeth of each pair.

In testimony whereof I affix my signature in presence of two witnesses.

NICHOLAS SCHWARTZ.

Witnesses:
GEO. W. MITCHELL,
E. W. SWARTHOUT.